United States Patent
Carpenter et al.

(10) Patent No.: US 7,175,060 B1
(45) Date of Patent: Feb. 13, 2007

(54) BED SLIDE THAT MOUNTS IN A VEHICLE USING PRE-EXISTING MOUNTING POINTS

(75) Inventors: Keith A. Carpenter, Medford, OR (US); Steve Robinson, Medford, OR (US); Dan Marshall, Medford, OR (US)

(73) Assignee: IFW, Inc., Central Point, OR (US)

( * ) Notice: Subject to any disclaimer, the term of this patent is extended or adjusted under 35 U.S.C. 154(b) by 0 days.

(21) Appl. No.: 10/280,890

(22) Filed: Oct. 24, 2002

(51) Int. Cl.
*B60R 7/00* (2006.01)

(52) U.S. Cl. .............. 224/403; 224/281; 224/510; 224/524; 224/547; 224/554; 224/557; 296/26.09

(58) Field of Classification Search ........... 224/403, 224/404, 405, 281, 496, 510, 524, 547, 554, 224/557; 296/26.09; 414/522
See application file for complete search history.

(56) References Cited

U.S. PATENT DOCUMENTS

| 3,132,755 | A | * | 5/1964 | Greenslate | 414/522 |
|---|---|---|---|---|---|
| 3,726,422 | A | * | 4/1973 | Zelin | 414/522 |
| 5,046,913 | A | * | 9/1991 | Domek et al. | 414/522 |
| 5,064,335 | A | * | 11/1991 | Bergeron et al. | 414/522 |
| 5,513,941 | A | * | 5/1996 | Kulas et al. | 414/522 |
| 5,934,725 | A | * | 8/1999 | Bowers | 296/26.09 |
| 5,944,371 | A | * | 8/1999 | Steiner et al. | 296/26.09 |
| 5,988,722 | A | * | 11/1999 | Parri | 296/26.09 |
| 6,065,792 | A | * | 5/2000 | Sciullo et al. | 296/26.09 |
| 6,120,075 | A | * | 9/2000 | Terry | 296/26.09 |
| 6,390,525 | B2 | * | 5/2002 | Carpenter et al. | 296/26.09 |
| 6,491,331 | B1 | * | 12/2002 | Fox | 296/26.09 |
| 6,705,656 | B2 | * | 3/2004 | Keller | 296/26.09 |

OTHER PUBLICATIONS

IFW, Inc., "BedSlide," Sportman's Gear, Feb. 2002, pp. 1-2 and 8-9, vol. 22, Issue 2, Cornett Publishing, Inc., Pelham, Alabama, USA.

* cited by examiner

*Primary Examiner*—Stephen K. Cronin
(74) *Attorney, Agent, or Firm*—Blakely Sokoloff Taylor & Zafman (57) ABSTRACT

A securing bracket for mounting a bed slide in a vehicle storage area is disclosed. The bed slide-mounting bracket is characterized by a body with a protrusion. The protrusion is formed comprising a cavity sufficient to affix the bed slide-mounting bracket to the vehicle storage area using pre-existing vehicle hardware.

9 Claims, 10 Drawing Sheets

BED SLIDE THAT MOUNTS IN A VEHICLE USING PRE-EXISTING MOUNTING POINTS

TECHNICAL FIELD

This invention relates to an apparatus for increasing access to vehicle storage areas, and more particularly, to a bed slide secured to a vehicle storage area using pre-existing mounting points within the vehicle.

BACKGROUND

Vehicles that are used for transporting equipment, supplies, or other items within enclosed areas can hold more items than are easily accessible. For instance, if a person fills a canopy or toneau covered pickup bed with tools, those tools near the tailgate are more accessible than the tools near the front of the bed (e.g., behind the cab of the truck). Other types of storage areas associated with other vehicles suffer from similar shortcomings.

One solution to the problem of accessing items in a vehicle storage area is the use of a bed slide. The term bed slide is meant to include any extendable platform used in the storage area of a vehicle to facilitate access of otherwise hard to reach locations.

Figure 1:
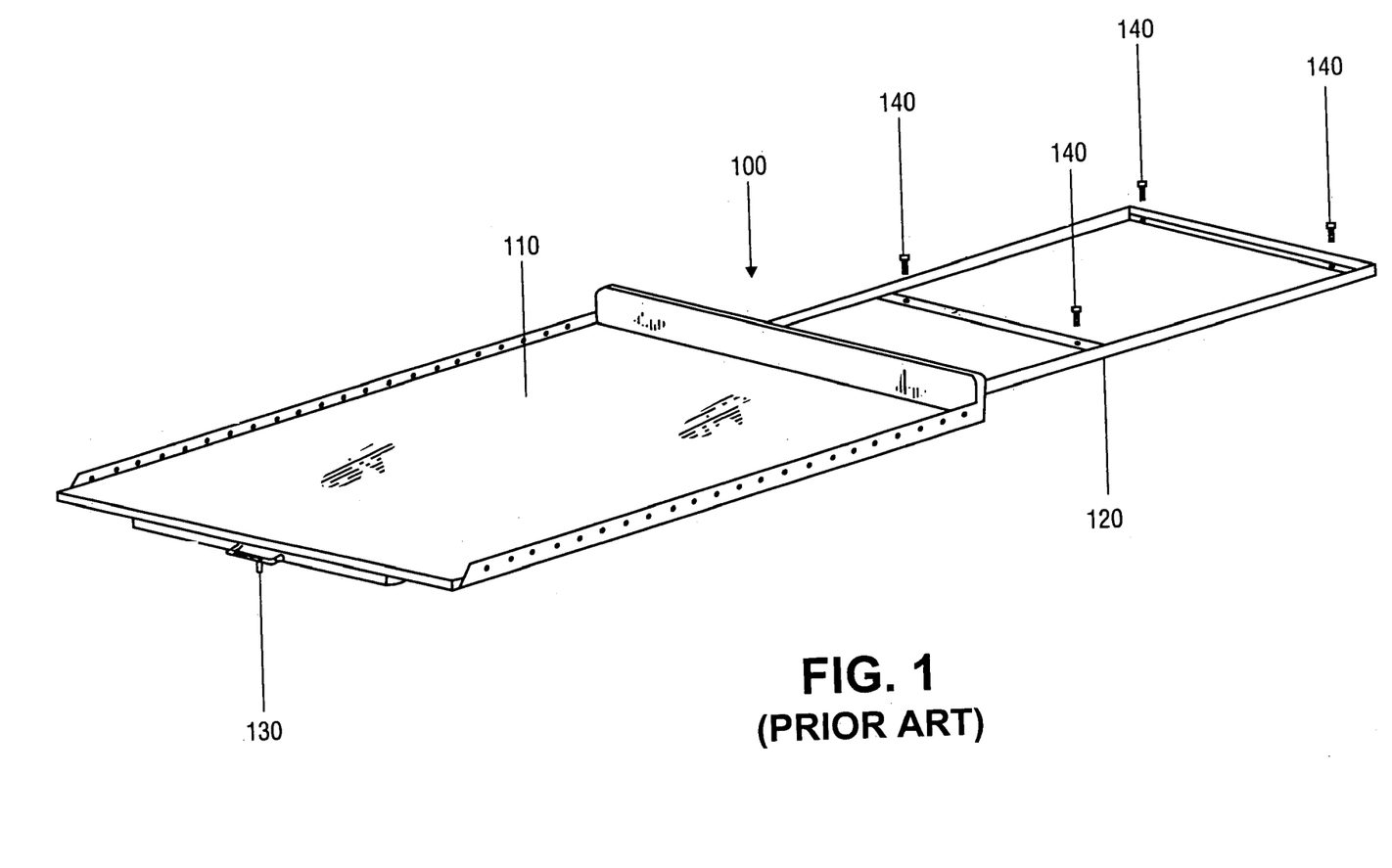
FIG. 1 is a perspective view of a prior art bed slide.

Conventional techniques for mounting bed slides result in undesirable modifications of the storage area by drilling holes in the floor of the vehicle storage area for the insertion of bolts or other fastening devices as shown in FIG. 1. This method of fastening the bed slide requires additional hardware as well as defaces and possibly damages the integrity of the vehicle storage area. Additionally, the practice of drilling holes from the topside of the vehicle storage area can result in damage to vehicle components that are located directly beneath the vehicle storage area. These important components may include fuel lines and/or spare tires.

FIG. 1 demonstrates how conventional bed slides are fastened to the vehicle storage area. Traditionally, a bed slide base 120 of a bed slide 100 is affixed to the storage area of the vehicle by fasteners 140. In order to install the fasteners 140, holes are drilled in the floor of the storage area and the fasteners 140 are installed. The traditional fastener-hole mounting system is also a disadvantage if the bed slide is subsequently removed. The installation procedure leaves holes in the storage area of the vehicle upon removal of the bed slide.

With the advent of the Ultimate Utility Vehicle (UUV), further problems for the conventional method of mounting bed slides are introduced. The term UUV is meant to include any vehicle, such as the Chevrolet® Avalanche® or the Cadillac® Escalade® EXT®, or any other vehicle which enables a user to change the body configuration to allow the bed storage area to be either open or closed to the passenger/cab area. With increased access between the storage area and the passenger/cab area, there is an increased concern of injury resulting from the conventional bed slide entering the passenger compartment in a collision. Conventional bed slide systems do not provide a sufficient momentum stop to prevent the bed slide platform 110 from sliding into the front of the passenger/cab area of the vehicle in the event of a severe collision. FIG. 1 demonstrates that the conventional method for stopping the forward motion of a bed slide is either a pin 130 from a latch mechanism or a bolt (not shown). In the event of a head on collision, the pin 130 or bolt is easily bent or sheared thereby allowing the bed slide platform 110 to continue forward into the passenger/cab area of the vehicle.

SUMMARY

In accordance with one embodiment of the present invention, a bed slide and techniques for attaching a bed slide to the storage area of a vehicle are presented. In accordance with one embodiment, an apparatus is presented comprising a mounting bracket with a protrusion that accommodates being connected to the storage area of the vehicle using the vehicle's pre-existing hardware.

BRIEF DESCRIPTION OF THE DRAWINGS

The invention is illustrated by way of example, and not by way of limitation. Like reference numerals refer to similar elements in the figures of the accompanying drawings.

DETAILED DESCRIPTION

Embodiments of the invention are generally drawn to a bed slide as well as apparatuses for securing a bed slide to the storage area of a vehicle using pre-existing vehicle mounting points. In the following description, for purposes of explanation, numerous specific details are set forth in order to provide a thorough understanding of the invention. It will be apparent, however, to one skilled in the art that the invention can be practiced without these specific details.

Example Overall Structure

Figure 2:
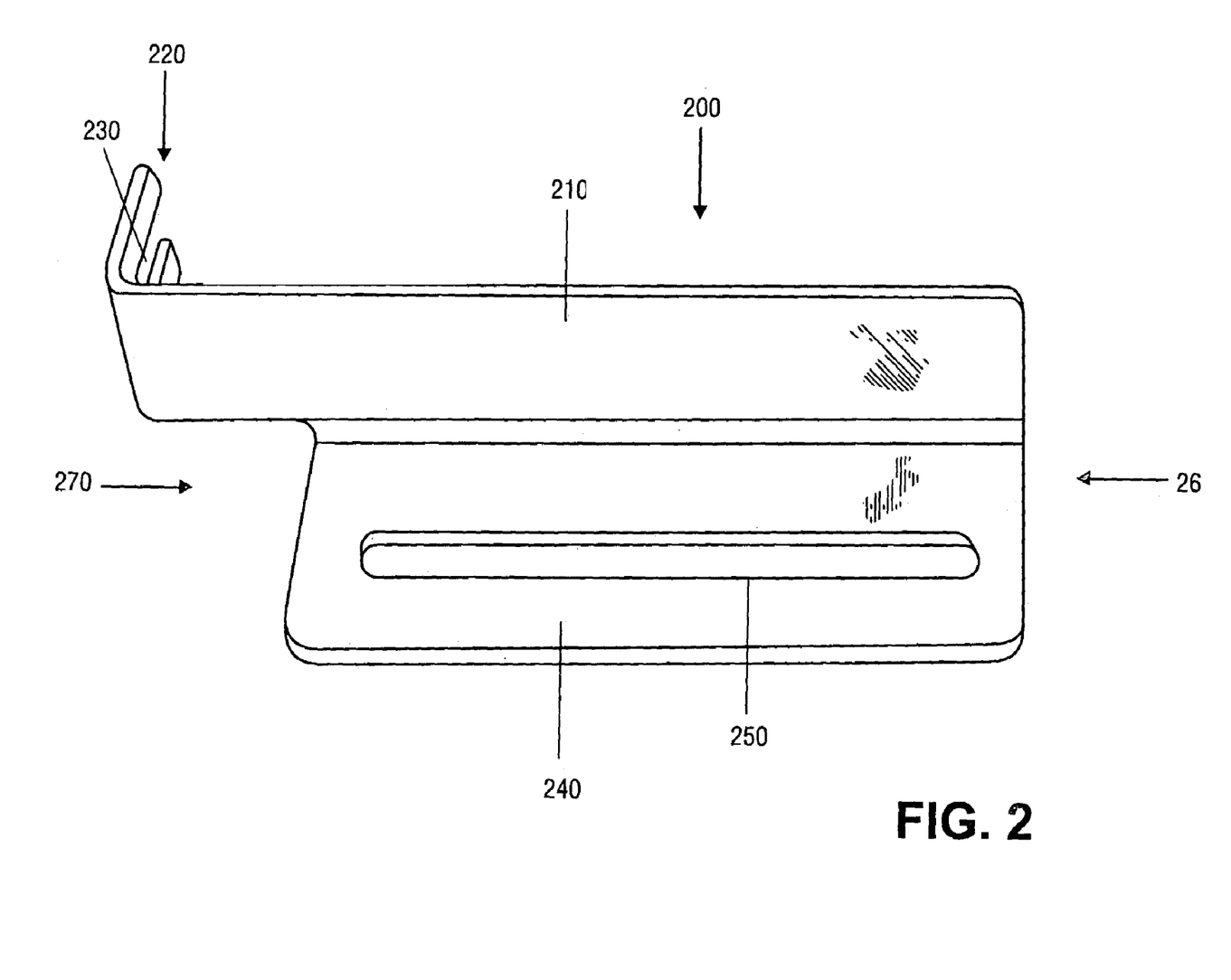
FIG. 2 is a perspective view of one embodiment of the bed slide-securing bracket.

FIG. 2 is a perspective view of one embodiment of an example bed slide-securing bracket. In accordance with the example of FIG. 2, the bed slide-securing bracket includes a main body 200 with an upper 210 and a lower 240 portion. The lower portion 240 of the body 200 further comprises a hole 250 sufficiently large to facilitate connection to a fastener to secure the bed slide base 400 to the main body 200 of the bracket. The illustrated example also depicts a protruding portion 220 extending from the distal end 270 of the body 200. The protrusion portion 220 of the bracket forms an approximately 90-degree elbow that terminates with a substantially flat piece. The substantially flat piece contains an orifice 230 sufficiently sized to receive the pre-existing hardware of a vehicle storage area tie-down.

Figure 3:
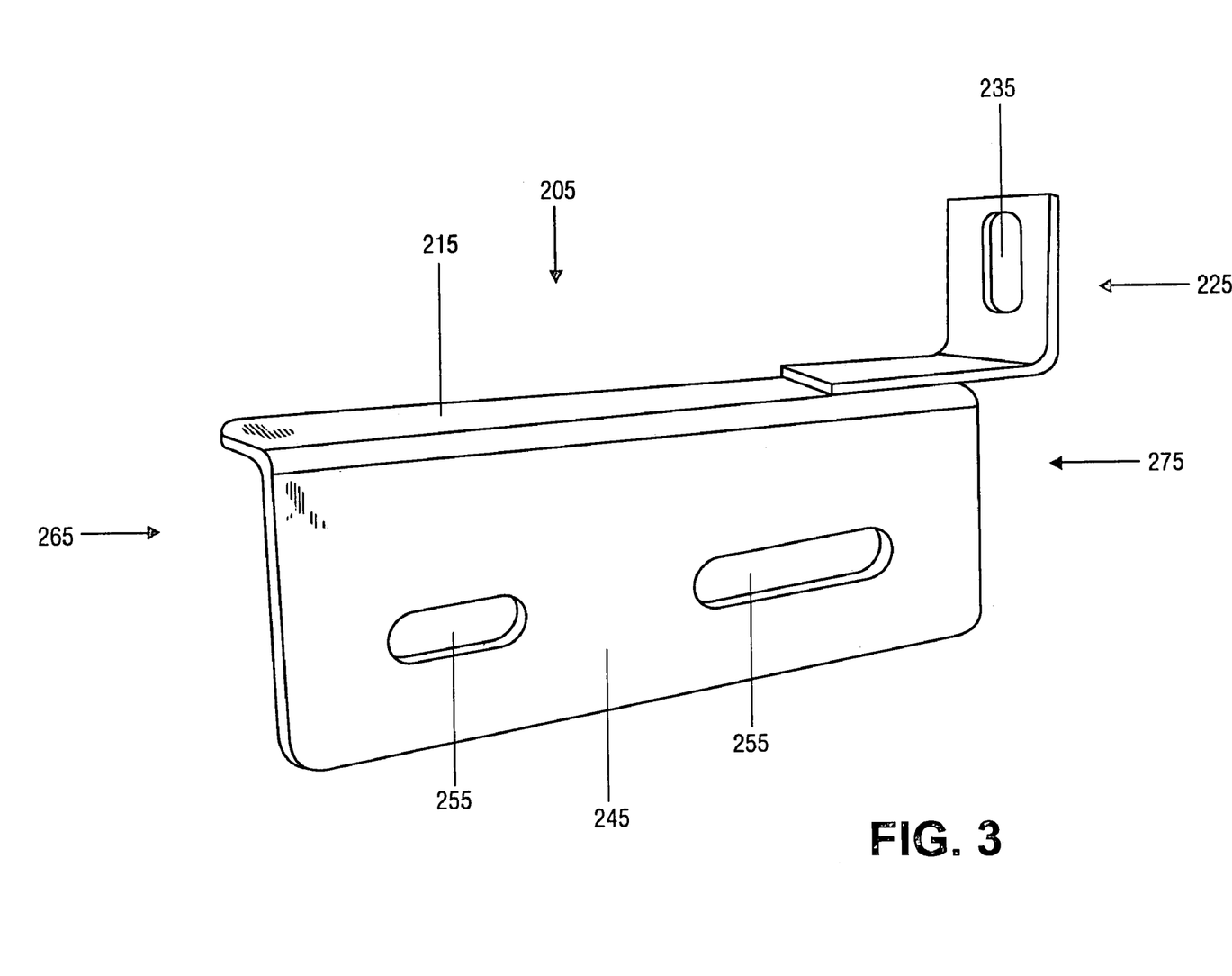
FIG. 3 is a perspective view of one embodiment of the bed slide-securing bracket.

The illustrated embodiment of the bed slide-securing bracket shown in FIG. 2 may be comprised of metal, polymer, a composite, or other similar materials or combinations of materials that are structurally adequate to support a bed slide FIG. 3 is a perspective view of an alternative embodiment of an example bed slide-securing bracket. FIG. 3 illustrates alternative embodiments for providing holes 255 sufficiently large to facilitate connection to a fastener. In FIG. 3, there are two horizontal holes 255 located in the lower portion 245 of the body 205. Additionally, FIG. 3 demonstrates that a number of different methods may be used to attach the protrusion 225 to the distal end 275 of the body 205. The protrusion 225 may be welded to the body 205 as demonstrated in FIG. 3, it may form an integral part of the body 205 as illustrated in FIG. 2, or the protrusion 225 may be connected to the body 205 by any number of fasteners.

Additionally, FIG. 3 also illustrates an alternative embodiment for providing an orifice 235 sufficiently sized to receive the pre-existing hardware of a vehicle storage area tie-down. As demonstrated in FIG. 3, the orifice 235 may be completely contained by the material making up the protrusion 225.

Figure 4:
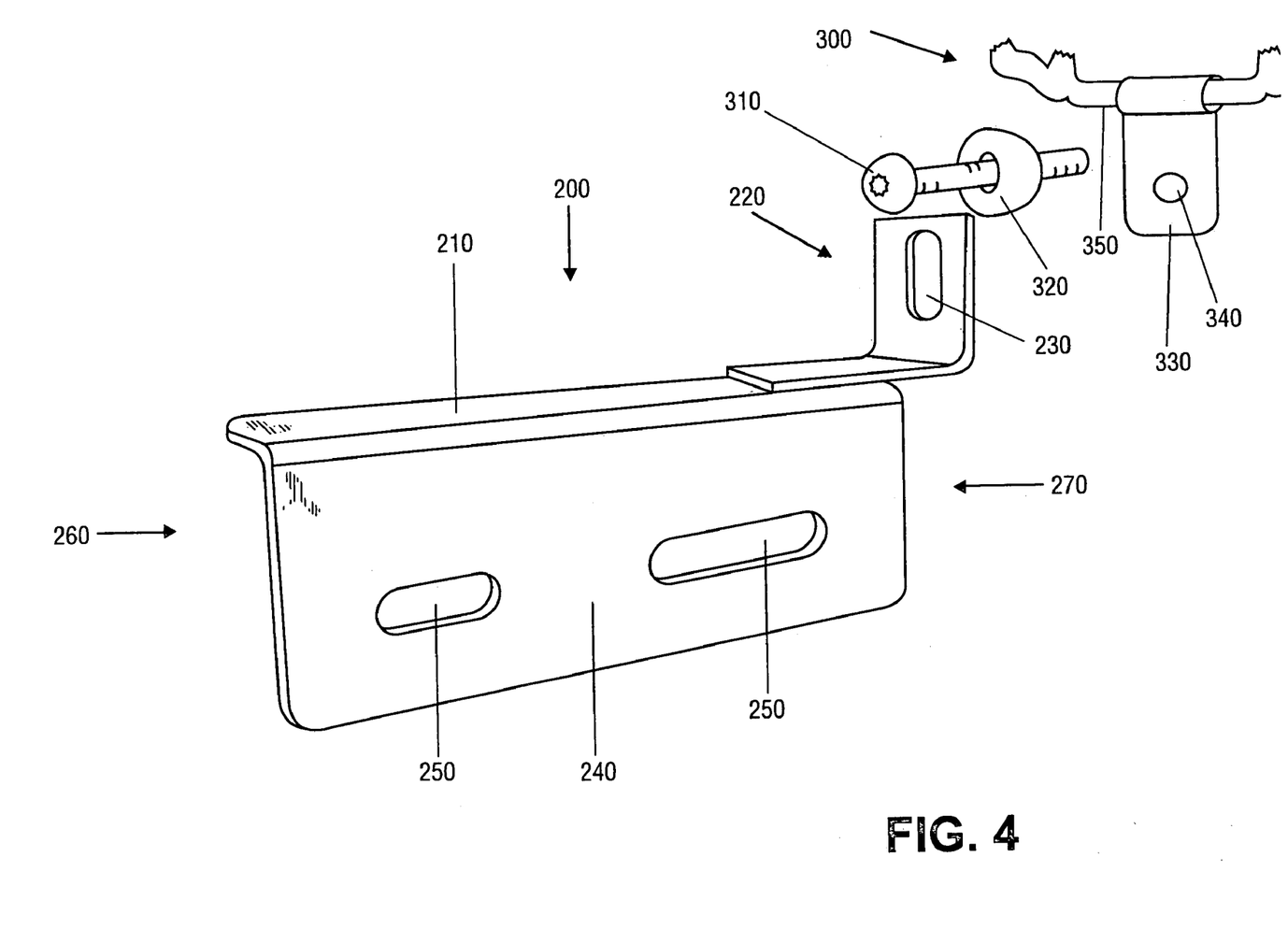
FIG. 4 is a perspective view of one embodiment of the bed slide-securing bracket in association with an embodiment of pre-existing vehicle hardware.

FIG. 4 is a perspective view of one embodiment of an example bed slide-securing bracket in association with an example of pre-existing hardware from the storage area of a vehicle. The demonstrated example of the pre-existing hardware comprises a fastening device 310, a washer 320, a tie-down loop 350, and a tie-down flange 330 with a hole 340 in the center. The bed slide-securing bracket is designed to work with any storage area hardware that includes a fastening device 310.

Figure 5:
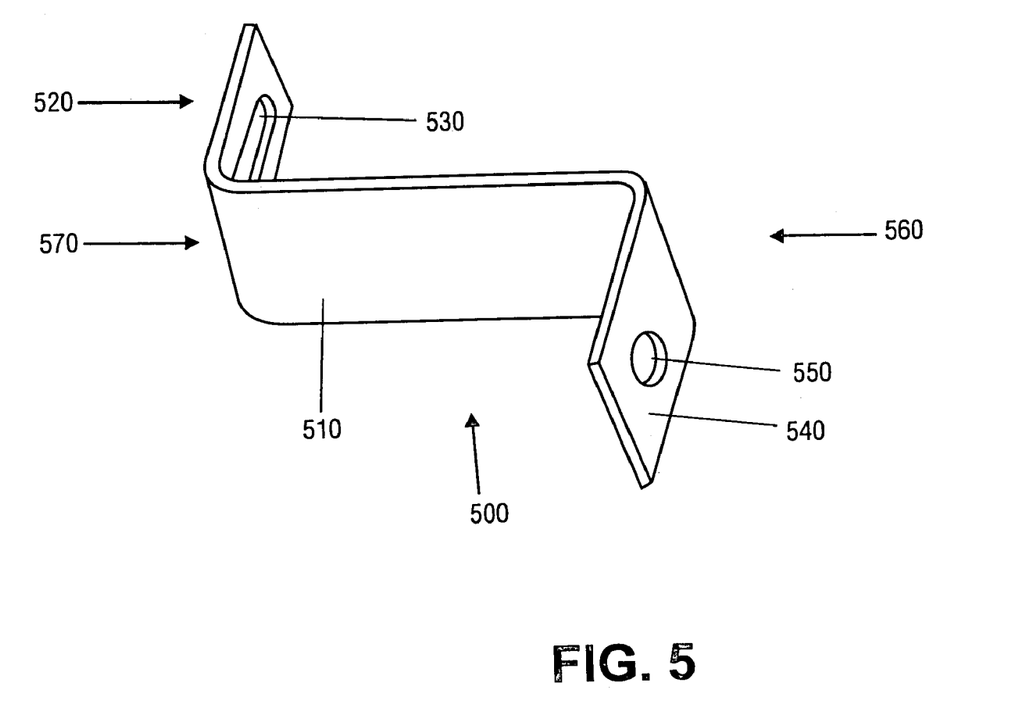
FIG. 5 is a perspective view of one embodiment of the bed slide-securing bracket.

FIG. 5 demonstrates an additional embodiment of an example bed slide-securing bracket. The embodiment demonstrated in FIG. 5 also comprises a body 500 with an upper 510 and lower portion 540. However, the lower portion 540 is substantially smaller than that demonstrated in FIG. 2 to allow for only a single fastener. The reduced size of the lower portion 540 also allows the bed slide-securing bracket to be secured to the side of the bed slide frame 400 rather than the front. This embodiment adds the ability to secure the bed slide frame 400 to a number of additional mounting points such as the rear of a UUV bed near the tailgate. Additionally, those of skill in the art will recognize that any number of fasteners may be used without varying from the teachings of the present invention.

Figure 8:
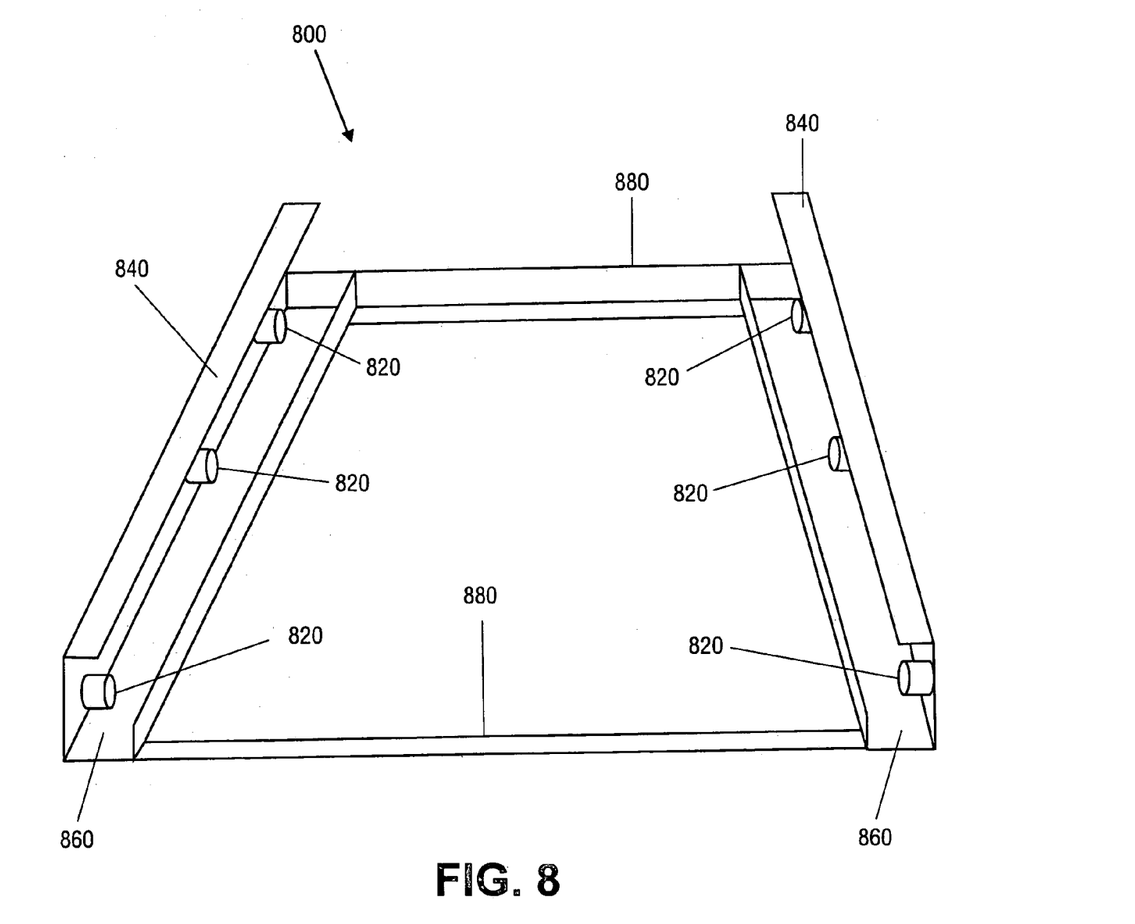
FIG. 8 is a perspective view of one embodiment of a bed slide base.

FIG. 8 demonstrates an embodiment of a bed slide base 800 that is possible with the above-mentioned bed slide-securing bracket. The demonstrated embodiment includes two bottom rails 860 positioned substantially parallel to each other. Joining the bottom rails is a number of cross supports 880. The cross supports 880 strengthen the bottom rails 860 and keep the bed slide base 800 substantially square. On the side of each bottom rail 860 located beneath the top securing rail 840 is attached a number of bearings 820.

Figure 9:
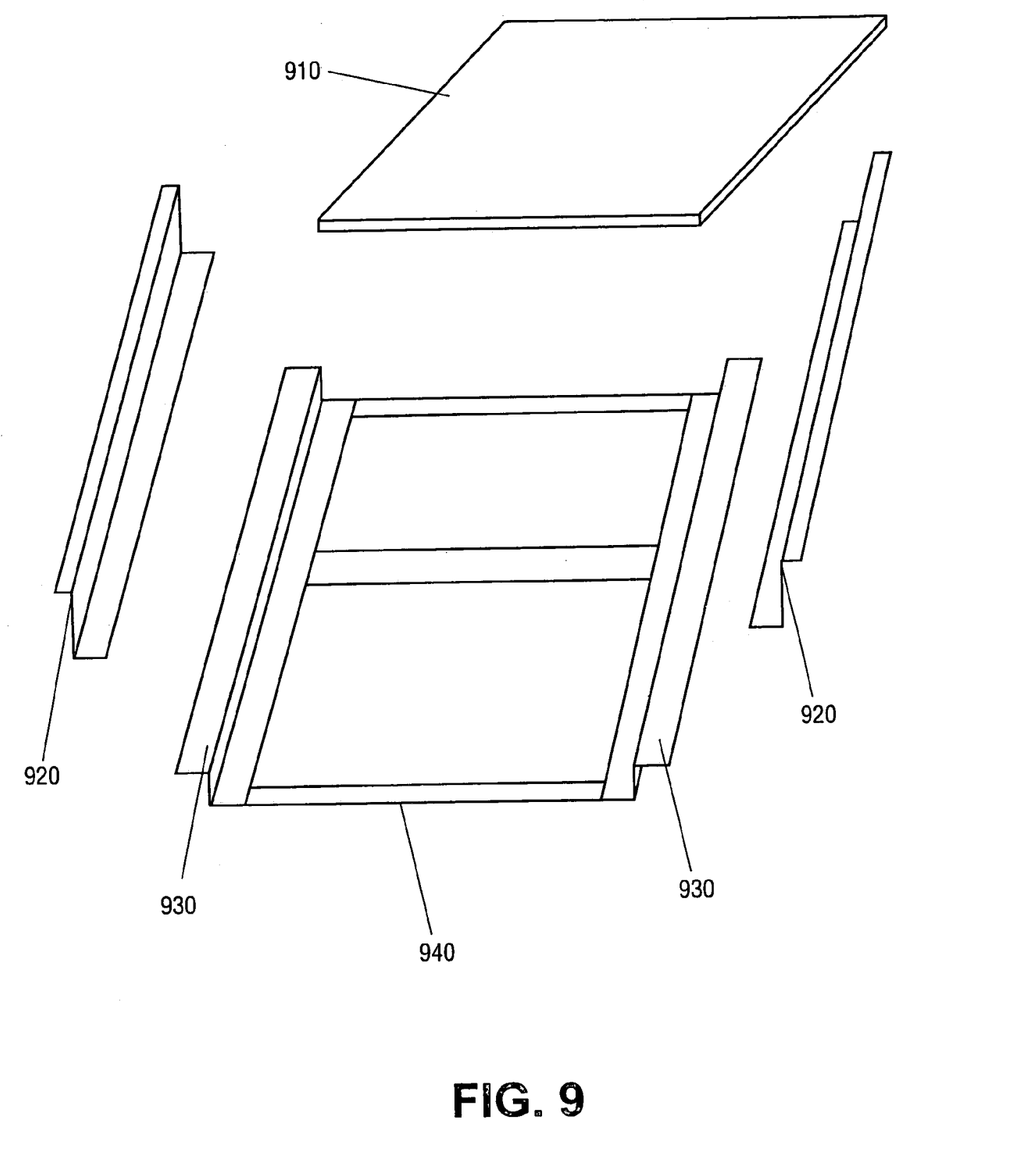
FIG. 9 is an exploded view of one embodiment of a bed slide platform.

FIG. 9 is an exploded view of the top section of a bed slide. As shown in FIG. 9, the top section is preferably composed of a platform 910 which sits upon and is fastened to a platform base 940. On each side of the platform base 940 is located a slide rail 930 which when assembled is allowed to slide on the bearings 820 of the bed slide base 800. Covering the slide rail 930 and fitting under the outer edge of the platform 910 is the side guards 920. The side guards 920 protect any cargo that is placed on the platform 910 from rubbing or catching on the top securing rail 840.

Example Implementation and Operation

Figure 6:
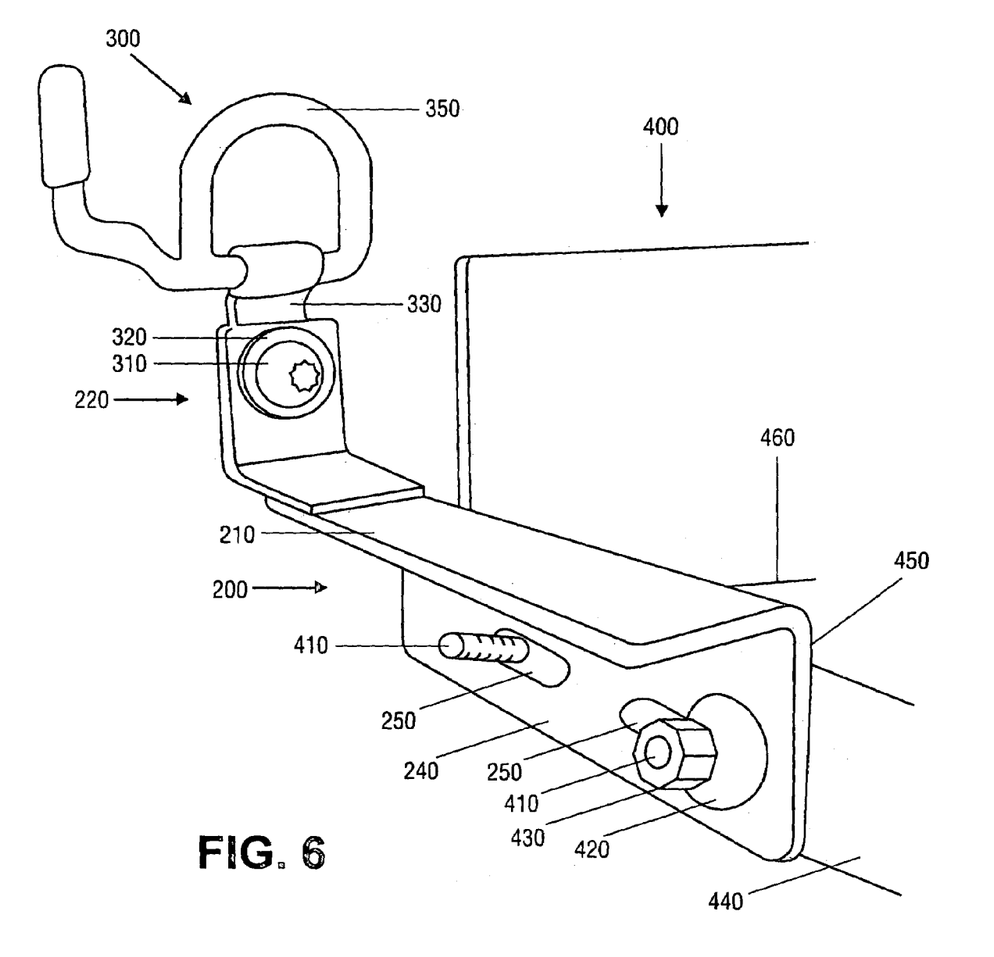
FIG. 6 is a perspective view of one embodiment of the bed slide-securing bracket assembled and affixed to a bed slide in a vehicle storage space.

FIG. 6 is a perspective view of one embodiment of a bed slide-securing bracket implemented in connection with pre-existing vehicle hardware. In accordance with the illustrated example implementation of FIG. 6, the bracket is assembled and affixed to a bed slide base 400 in a vehicle storage space. For ease of explanation only, the description will be developed within the context of installing a bed slide 100 into a Chevrolet® Avalanche® or similar vehicle.

As demonstrated in FIG. 6, one embodiment of the bed slide-securing bracket utilizes the pre-existing vehicle hardware to attach the bracket and bed slide to the vehicle. In order to facilitate the attachment, the tie-down screw(s) 310 (or other vehicle hardware) is loosened from the side of the vehicle storage area. For an embodiment of the open ended bracket displayed in FIG. 2, the tie-down screw(s) 310 need only be loosened enough to slide the protrusion 220 under the tie-down screw(s) 310. For an embodiment of the closed ended bracket, the entire tie-down screw(s) 310 must be removed.

With the tie-down screw(s) 310 loosened, the open-ended protrusion 220 is slid under the washer 320 and under the tie-down screw 310. Alternatively, if the closed ended embodiment of the bed slide-securing bracket is used, the removed tie-down screw 310 and washer 320 are inserted into the protrusion hole 230.

Once the protrusion 220 of the bracket is in contact with the tie-down screw 310, the tie-down screw 310 is lightly tightened to the pre-existing mounting point. This allows the bracket to be lightly secured to the bed or storage area of the vehicle while still allowing for some movement of the body of the bracket 200.

With the bracket lightly secured to the vehicle storage area, the holes (not shown) in the front of the bed slide base 400 can be aligned with the hole(s) 250 in the lower body 240 of the bracket. The bed slide base 400 can be attached to the bed slide-securing bracket by inserting a fastening device 410 through the hole(s) 250 and securing it with a securing device 420, 430. To complete the installation, the tie-down screw 310 is then tightened.

Due to the shape of the bracket, a barrier is formed preventing the bed slide from extending forward into the cab/passenger area of the vehicle. The distance between the hole(s) 250 in the lower portion 240 of the body 200 and the top portion 210 of the body 200 is greater than the distance from the holes (not shown) in the bed slide base 400 and the bottom of the bottom rail 460. The inequality in height creates a stop(s) 450 at the end of the bed slide base 400. In the event of a collision, the bed slide will only slide forward on the base 400 until it comes in contact with the stop(s) 450 thus increasing safety.

Figure 7:
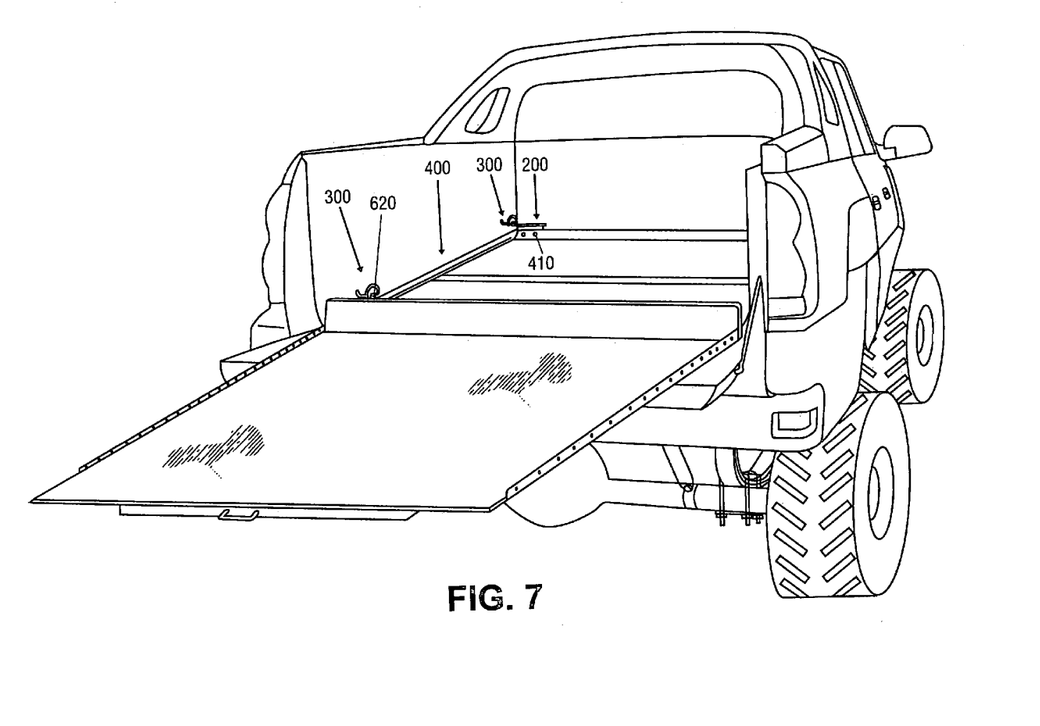
FIG. 7 is a perspective view of one embodiment of a bed slide-securing bracket assembled to an embodiment of a bed slide and affixed to the cargo area of a UUV.

FIG. 7 is a perspective view of one embodiment of a bed slide-securing bracket assembled to an embodiment of a bed slide and affixed to the cargo area of a UUV. As demonstrated in FIG. 7, the bed slide base 400 may be secured at the factory-installed tie-down 300. FIG. 7 also demonstrates how an alternative embodiment of the bed slide-securing bracket can be installed on the side of the bed slide base 400 near the rear of the vehicle storage area. Once installed, there are only original holes in the storage area of the vehicle since the only securing devices attached to the bed slide base were subsequently attached to the pre-existing hardware at the factory mounting points rather than through the floor of the vehicle storage area.

FIG. 7 also demonstrates an additional advantage of one embodiment of a bed slide-securing bracket. As demonstrated in FIG. 7, with the bed slide securely fastened to the storage area of the vehicle, the factory-installed tie-down 300 is still useable. By only utilizing the tie-down screw 310 to attach the bracket, there is little or no limitation on the motion of the factory-installed tie-down 300.

Figure 10:
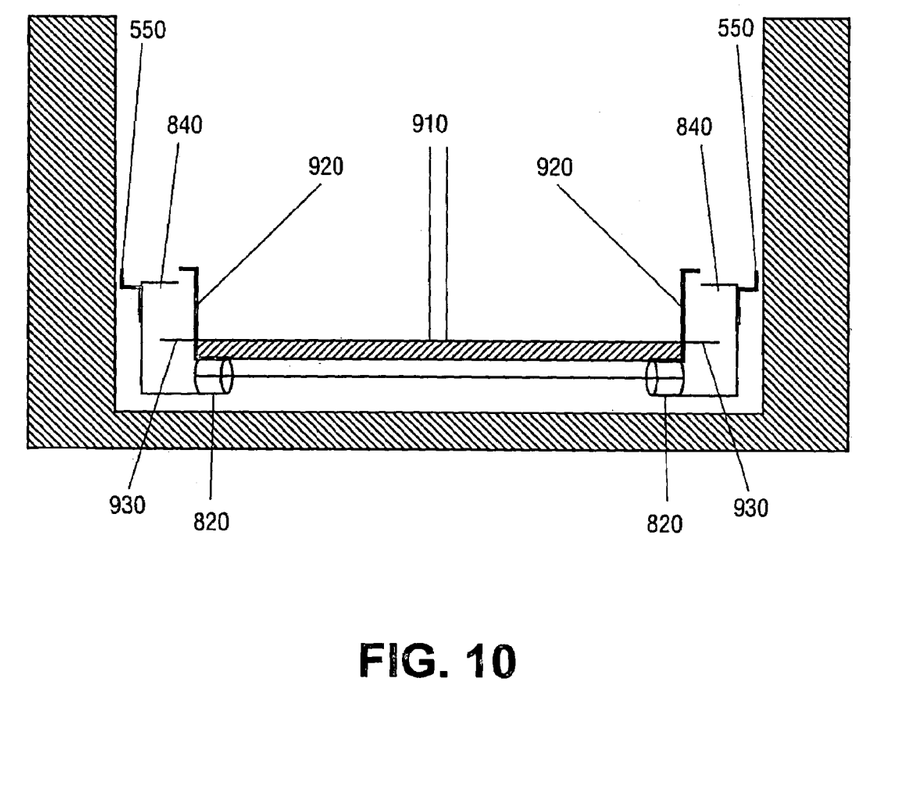
FIG. 10 is a perspective view of an assembled bed slide platform and base.

FIG. 10 illustrates a modified bed slide attached to a UUV by a bed slide-securing bracket 550. As shown in FIG. 10, the bottom rail 860 of the bed slide base 800 is fastened to the bed of a UUV using only a bed slide-securing bracket 550 and the pre-existing hardware. With the base 800 securely attached to the UUV, the top of the bed slide may be inserted. The slide rail 930 is slid between the top of the bearings 820 and the bottom of the top-securing rail 840. As demonstrated in FIG. 10, the side guards 920 extend above and around the top-securing rail 840 thereby protecting anything that may be on the platform 910 from being damaged.

The unique method of mounting the bed slide base 800 to the UUV using only pre-existing hardware allows the bottom of the platform base 940, and consequently the platform 910 to extend further down towards the bottom of the bed. This configuration is advantageous because it allows for additional space between the platform 910 and a toneau cover. This added space allows the user to store objects that have a higher profile than those objects allowed by conventional bed slides.

ALTERNATIVE EMBODIMENTS

According to one embodiment of the bed slide bracket, the bed slide bracket forms an integral part of the bed slide base 400. This embodiment eliminates the need for additional securing devices 410 to join the bracket to the bed slide base 400. This embodiment also allows for securing a bed slide base 400 using only the vehicle hardware located at pre-existing mounting points, thereby avoiding the previously mentioned shortcomings of conventional installation methods.

In an additional embodiment of the modified bed slide, a bearing may be attached to the upper portion of the slide rail 930. This additional bearing will act as a leveler for the platform 910 by providing a force opposite that caused by any load on the platform 910.

Attached as an appendix are detailed illustrations of one embodiment of a bedslide as described herein. Other embodiments can also be provided without deviating from the scope of the invention as claimed below.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
    a bed slide having a frame and a top portion slideably connected to the frame; and
    a plurality of mounting brackets connected to the bed slide frame to affix the frame to a bed of a pickup truck to secure the frame of the bed slide to the bed of the pickup truck using multiple pre-existing tie-down mounting points such that, when the bed slide frame is attached to the bed of the pickup truck, the original tie-downs are attached to the bed of the pickup truck and the tie-downs are functional with the bed slide attached to the bed of the pickup truck.

2. An apparatus according to claim 1, wherein the bed slide and the mounting brackets are manufactured from aluminum.

3. An apparatus according to claim 1, wherein a portion of the bed slide is formed form a single extruded piece.

4. An apparatus according to claim 1, wherein the bed slide comprises:
    a bottom frame to attach to the storage area of the vehicle; and
    a top portion to slideably connect to the bottom frame.

5. An apparatus according to claim 4, wherein the top portion comprises:
    a platform; and
    a steel angle iron border.

6. An apparatus according to claim 5, wherein the platform is a sheet of plywood with a carpeted top.

7. An apparatus according to claim 5, wherein the steel angle iron border further comprises:
    a first substantially horizontal member on the border to slide on the bottom frame;
    a substantially vertical member to form a side of the border extending downward from the substantially horizontal member; and
    a second substantially horizontal member coupled to the substantially vertical member to support the platform within two inches of the bottom of the bed.

8. An apparatus according to claim 7, further comprising a side guard to cover the slide rail and the bottom frame.

9. An apparatus according to claim 7, wherein the bottom frame further comprises:
    side rail members;
    support members coupled to the side rail members; and
    bearings coupled to the side of the side rail members for supporting and aiding in the sliding of the first substantially horizontal member.

\* \* \* \* \*